United States Patent [19]

Moos et al.

[11] Patent Number: 4,660,652
[45] Date of Patent: Apr. 28, 1987

[54] HYDRAULIC TRIP MECHANISM

[75] Inventors: Niklaus J. Moos, Burgdorf, Switzerland; Richard C. Papworth, Lethbridge, Canada

[73] Assignee: Versatile Corporation, Vancouver, Canada

[21] Appl. No.: 593,248

[22] Filed: Mar. 22, 1984

[30] Foreign Application Priority Data

Aug. 30, 1983 [CA] Canada .................................. 435626

[51] Int. Cl.$^4$ ............................................. A01B 61/04
[52] U.S. Cl. .................................... 172/260.5; 172/709
[58] Field of Search ...................... 172/260.5, 264, 265, 172/709, 705, 710, 711, 748

[56] References Cited

U.S. PATENT DOCUMENTS

| 3,490,544 | 1/1970 | Godbersen | 172/705 |
| 3,536,141 | 10/1970 | Woelfel | 172/260.5 |
| 3,605,905 | 9/1971 | Bo | 172/260.5 |
| 3,789,928 | 2/1974 | Nja | 172/709 |
| 4,363,363 | 12/1982 | Dyck | 172/264 |
| 4,452,317 | 6/1984 | Moos | 172/709 |

FOREIGN PATENT DOCUMENTS

| 2930742 | 5/1980 | Fed. Rep. of Germany | 172/260.5 |
| 2302015 | 9/1976 | France | 172/260.5 |
| 1579927 | 11/1980 | United Kingdom | 172/260.5 |

Primary Examiner—Richard J. Johnson
Attorney, Agent, or Firm—Wenderoth, Lind & Ponack

[57] ABSTRACT

A trip mechanism which allows the ground working tool of an implement to pivot about three orthogonal axes. The tool is connected to a shank which is attached to a carriage. The carriage is pivotally connected to the frame of an implement through a ball joint connection. Two arms extend from the carriage on one side of the ball joint and are connected to the frame thereby defining the working position. A hydraulic cylinder provides the necessary force to keep the carriage in its working position and allows deflection of the tool when an obstruction is encountered.

6 Claims, 7 Drawing Figures

4,660,652

HYDRAULIC TRIP MECHANISM

This application relates to a trip mechanism and, in particular, to a trip mechanism used for the ground working tools of an agricultural implement.

BACKGROUND OF THE INVENTION

Many types of trip mechanisms for ground working implement tools have been proposed. These designs, however, have generally been adapted for use on ground working tools with relatively narrow soil working widths. Forces exerted on such tools by debris or rocks in the soil create a force which generally causes the implement to trip rearwardly and to then return to its working position when the obstruction has passed.

Blade cultivators have a wide sweep reaching a width of several feet or more. Thus, the force caused by an obstruction in the soil can be exerted anywhere along the blade width. When the force is exerted on the blade near its outermost width and because of the rearward sweep of the blade, the trip moment force generated may not be great enough to cause the tool to trip.

SUMMARY OF THE INVENTION

According to the present invention, there is disclosed a trip mechanism comprising a ground working tool, a shank connected to said tool, a carriage connected to said shank, three point connection means between said carriage and the frame of an implement, one of said three point connection means being a universal joint type connection member and two of said three point connections being pin and recess type connection members positioned symmetrically on opposite sides of said universal joint type connection member and hydraulic cylinder restraining means acting between said carriage and said frame and being operable to allow movement of said ground working tool between operating untripped and tripped positions.

BRIEF DESCRIPTION OF THE SEVERAL VIEWS OF THE DRAWINGS

The invention will now be described, by way of example only, with reference to the accompanying drawings, in which.

DESCRIPTION OF SPECIFIC EMBODIMENT

Figure 1:
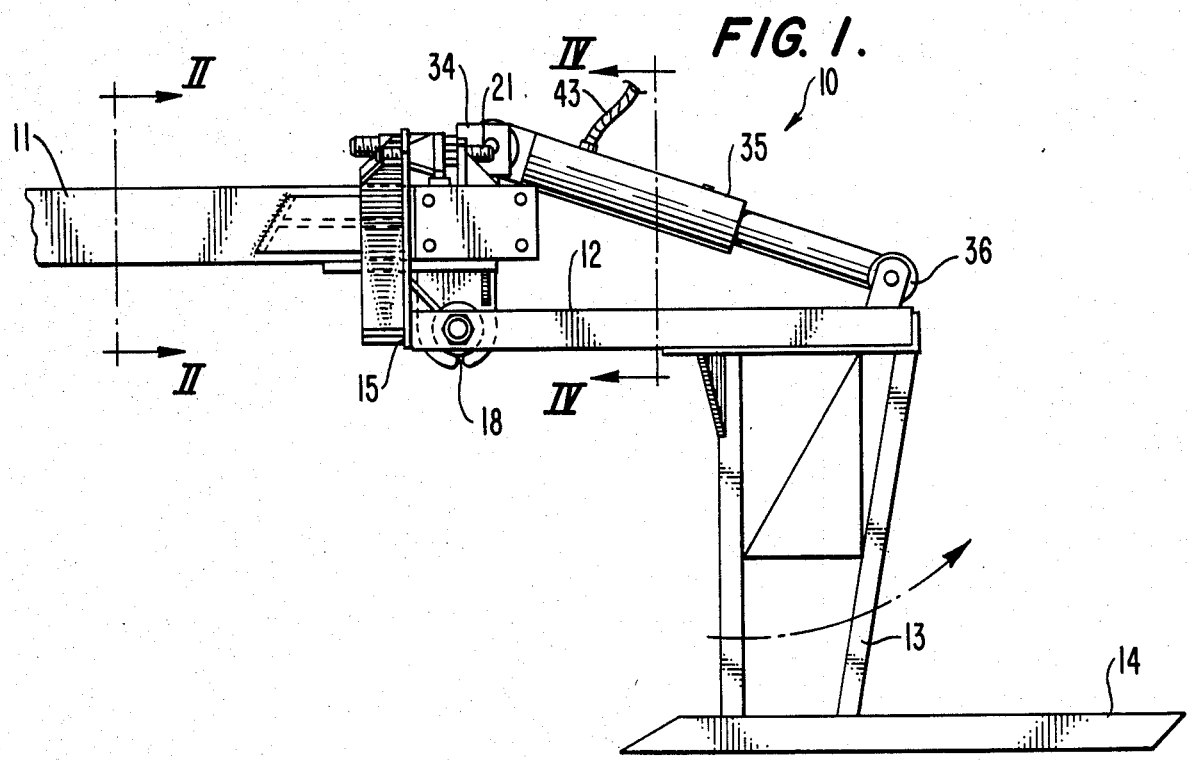
FIG. 1 is a side view of the blade cultivator and trip mechanism.
Figure 2:
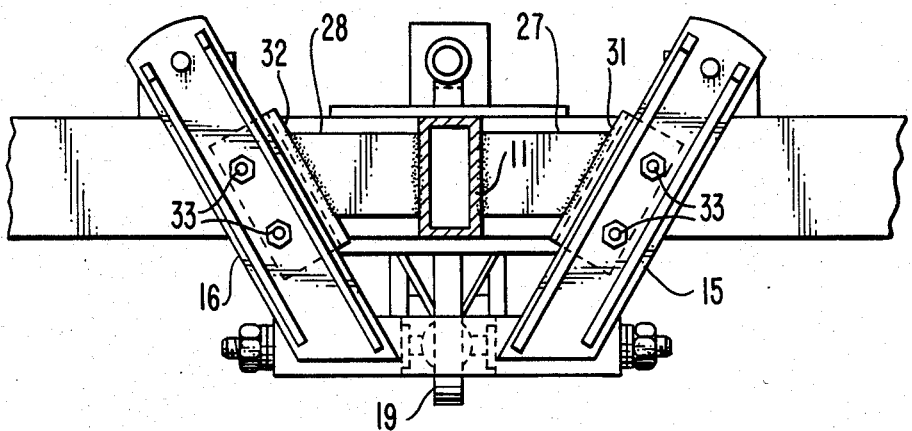
FIG. 2 is a view of the forward end of the blade cultivator and trip mechanism as seen in II—II of FIG. 1.

Referring now to the drawings, a trip mechanism is shown generally at 10 in FIG. 1. It is shown in position between the frame 11 of the implement and the carriage 12 to which shank 13 and blade 14 are attached.

Figure 4:
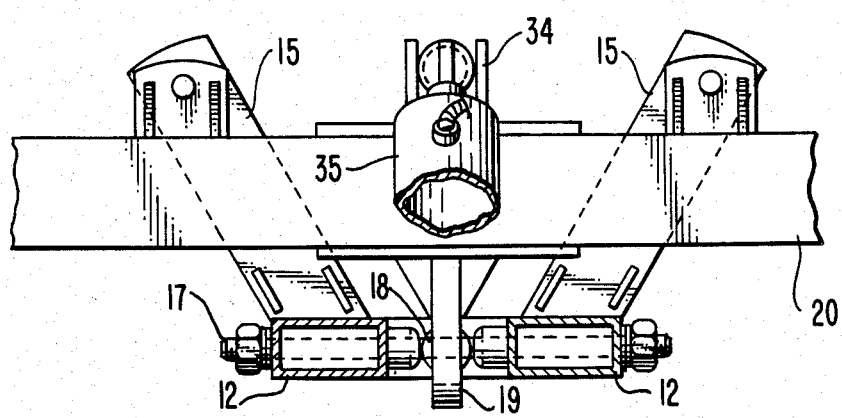
FIG. 4 is a cutaway partial view of the blade cultivator and trip mechanism as seen in IV—IV of FIG. 1.

The carriage 12 terminates at the forward end in twin left and right arms 15, 16, respectively. A stud 17 with threaded opposed ends extends through carriage 12 and ball joint 18 and respective nuts are attached (FIG. 4). Ball joint 18 is mounted in an extension bracket 19 which extends downwardly from a cross-member 20 of the frame 11 of the implement.

Figure 3:
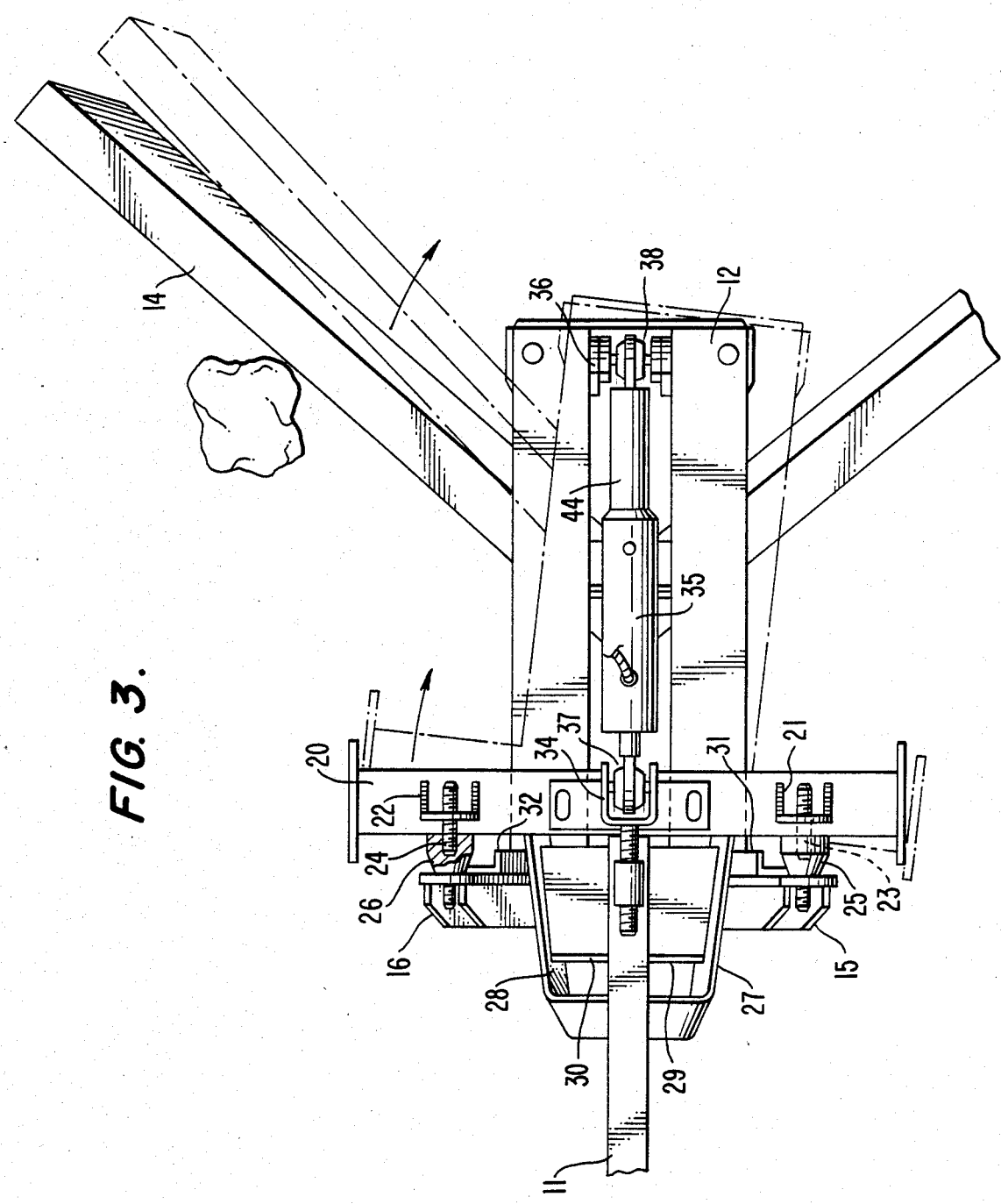
FIG. 3 is a plan view of the blade cultivator and trip mechanism.

A pair of retaining brackets 21, 22 extend upwardly from the cross-member 20 of frame 11 (FIG. 3). Respective ball pins 23, 24 are mounted in the respective retaining brackets 21, 22 and the ball pins 23, 24 extend forwardly of the retaining brackets 21, 22. One of a pair of ball sockets 25, 26 is mounted to each of the left and right arms 15, 16, respectively and the ball pins 23, 24 fit therein.

Left and right guide plates 27, 28 are welded to frame 11 and each extends outwardly from frame 11 and rearwardly to connect with cross-member 20. Left and right reinforcements 29, 30 extend between the frame 11 and the left and right guide plates 27, 28 respectively. Adjustable guides 31, 32 are mounted on left and right arms 15, 16 respectively, by bolts 33 and may be adjusted to move inwardly from arms 15, 16.

A retaining bracket 34 extends upwardly from cross-member 20. Hydraulic cylinder 35 extends between retaining bracket 34 and a second retaining bracket 36 which extends upwardly from the rearward portion of the carriage 12. Hydraulic cylinder 35 has ball joints 37, 38 (FIG. 3) mounted on opposite ends in the retaining brackets 34, 36, respectively.

Figure 5:
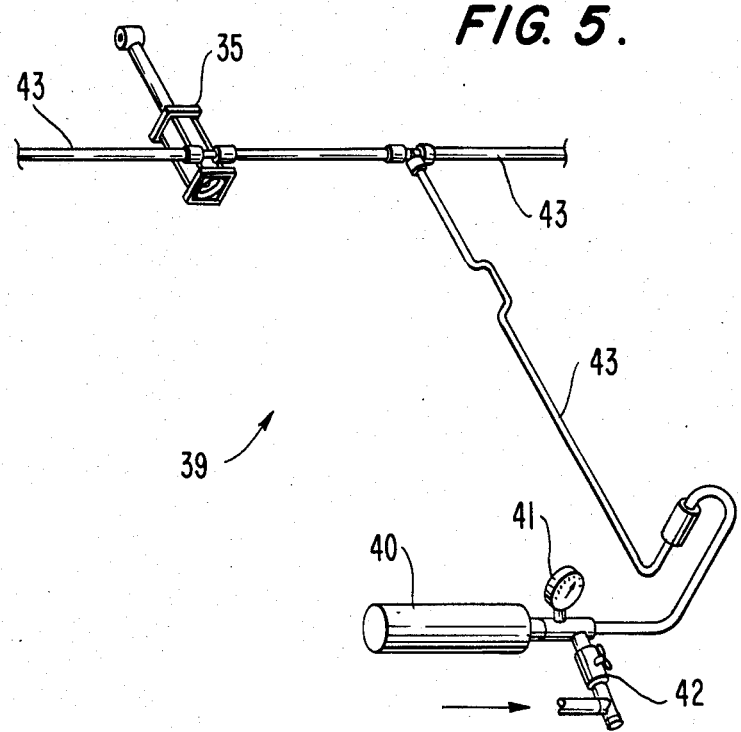
FIG. 5 is a partial diagrammatic view of the hydraulic system components used in association with the blade cultivator and trip mechanism.
Figure 5A:
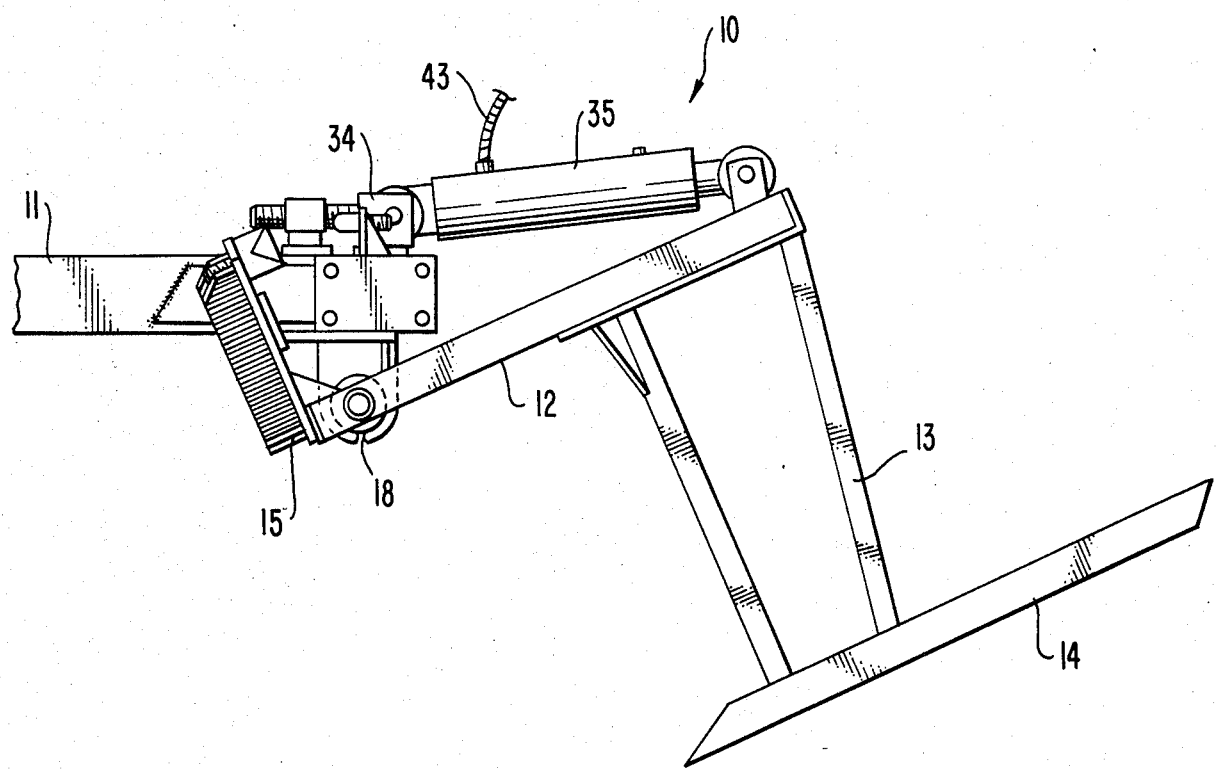
FIGS. 5A and 5B are, respectively, elevation and plan views of the tool mechanism in different tripped positions.
Figure 5B:
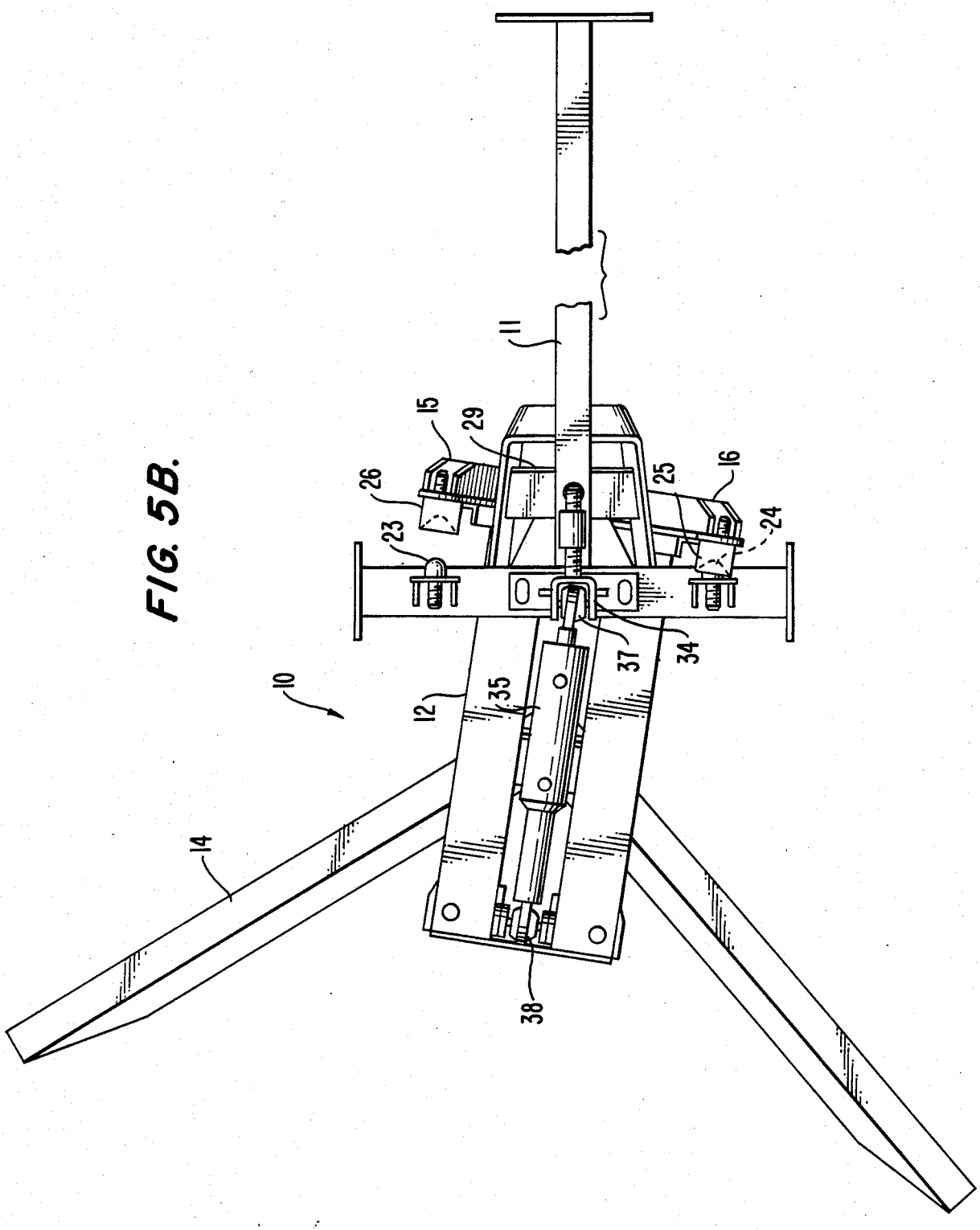

The hydraulic system is shown generally at 39 in FIG. 5. A source of oil for the hydraulic pump on the tractor (not shown) pulling the implement (not shown) is provided. This oil source provides the initial pressure to accumulator 40. A pressure gauge 41 is used to depict the pressure in the accumulator 40 and a valve 42 is operable to isolate the accumulator 40 and its accompanying hydraulic system 38 from the pressure source on the tractor. Fluid line 43 extends to the hydraulic cylinder 35 from the accumulator 40. Although only one cylinder 35 is shown, it will be realized there will exist a cylinder 35 for each trip mechanism 10.

OPERATION

In operation, the implement (not shown) will be proceeding leftwardly as seen in FIG. 1. The blade 14 will be proceeding in a substantially horizontal position beneath the surface of the soil.

When an obstruction such as a large rock is encountered against the blade 14 as seen in FIG. 3, the blade 14, shank 13 and carriage 12 will tend to move rearwardly and upwardly about the horizontal axis of ball joint 18 as seen by the arrow in FIG. 1 and rightwardly as shown by the arrow in FIG. 3 about the contact between ball pin 23 and ball socket 25 while simultaneously moving about the rearwardly directed horizontal axis of the ball joint 18. The ball pin 24 and ball socket 26 will separate, the right arm 16 moving with ball socket 26 away from the ball pin 24.

As the blade 14 moves away from its working position and over the obstruction, the hydraulic cylinder 35 is simultaneously pivoting about ball joint 37 in retaining bracket 34 and ball joint 38 in retaining bracket 36. The piston rod 44 is contracting into hydraulic cylinder 35 and hydraulic fluid is being forced from cylinder 35 through fluid line 43 and into accumulator 40 (FIG. 5). Accumulator 40 will absorb the shock of the obstruction against the blade 14 and allow the fluid to leave hydraulic cylinder 35.

After the obstruction has passed, accumulator 40 will force fluid back into cylinder 35 through fluid line 43 and this will tend to return the blade 14 and shank 13 to the untripped position shown in FIG. 1. As the right arm 16 returns, it is guided to its working position by right guide plate 28 (FIG. 3) and adjustable guide 32. Guide plate 28 simply guides the arm 16 to its untripped position where ball socket 26 again mates with ball pin 24.

The adjustable guide 32 may be adjusted by bolts 33 to provide the correct clearance for proper return of the arm 16.

If the obstruction contacts the blade 11 on the opposite side from that shown, the left arm 15 will move away with ball socket 25 from ball pin 23 and, upon its subsequent return, the left guide plate 27 and adjustable guide 31 will act to guide the arm 15 to its untripped working position in a manner similar to that described in relation to right guide plate 28. Adjustable guide 31 is similarly adjustable by using bolts 33 to ensure the proper return of the arm 15 to its untripped working position.

If the obstruction should contact the blade 14 at the central location, the blade 14 will simply pivot rearwardly about ball joint 18, both left and right arms 15, 16 moving away with their respective ball sockets 25, 26 from ball pins 23, 24. The blade 14 will return to its untripped position depicted in FIG. 1 after the obstruction has passed, the left and right arms 15, 16 being guided to the untripped position by left and right guide plates 27, 28, respectively.

While the hydraulic cylinder 35 has been found to operate quite suitably, it could, of course, be replaced with a mechanism which allows a sufficient force to the carriage 12 to keep it in the untripped ground working position but which will allow deflection when an obstruction is encountered and, thereafter, return the blade 14 to its original position.

The specific embodiments and modifications described are illustrative only and are not intended to limit the scope of the invention which should be construed in accordance with the accompanying claims.

We claim:

1. A trip mechanism for a ground working tool having a shank connected to said tool, said trip mechanism comprising a forwardly extending carriage rigidly connected to said shank, three point support means between the forward end of said carriage and the frame of an implement, one of said three point support means being a universal pivot connection pivotally connecting the carriage to the frame and two of said three point support means being pin and recess type connection members positioned symmetrically on opposite sides of said universal pivot connection and hydraulic cylinder restraining means having one end universally pivotally connected to said frame vertically spaced from said pivot connection and a second end universally connected to said carriage acting between said carriage and said frame and being operable to allow movement of said ground working tool between an operating untripped position and laterally or upwardly disposed tripped positions.

2. A trip mechanism as in claim 1 wherein said universal pivot connection member is a ball joint.

3. A trip mechanism as in claim 2 wherein said hydraulic cylinder is connected to a hydraulic circuit and said hydraulic circuit includes an accumulator to provide pressure to said hydraulic circuit.

4. A trip mechanism as in claim 3 wherein said hydraulic cylinder is connected between said carriage and said frame by ball joint connection means.

5. A trip mechanism as in claim 4 wherein said carriage further comprises two arms, each of said arms extending from said carriage to a respective pin and recess type connection member, said arms being located on the side of said carriage adjacent said ball joint connection means and opposed to the side of said carriage carrying said shank.

6. A trip mechanism as in claim 5 and further including guide means for each of said said arms, said guide means being operable to guide said arms from said tripped to said operating untripped position.

* * * * *